US012699026B2

(12) United States Patent
Pape et al.

(10) Patent No.: US 12,699,026 B2
(45) Date of Patent: Aug. 4, 2026

(54) METHOD AND VEHICLE SYSTEM FOR DETERMINING THE STATE OF THE COMPONENTS OF A CHASSIS

(71) Applicant: ZF Friedrichshafen AG, Friedrichshafen (DE)

(72) Inventors: Dennis Pape, Ostercappeln (DE); Tobias Pobandt, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 292 days.

(21) Appl. No.: 18/552,605

(22) PCT Filed: Dec. 9, 2021

(86) PCT No.: PCT/EP2021/084997
§ 371 (c)(1),
(2) Date: Sep. 26, 2023

(87) PCT Pub. No.: WO2022/207134
PCT Pub. Date: Oct. 6, 2022

(65) Prior Publication Data
US 2024/0183753 A1 Jun. 6, 2024

(30) Foreign Application Priority Data

Mar. 31, 2021 (DE) .................... 10 2021 203 266.4

(51) Int. Cl.
*G01M 17/007* (2006.01)
*G07C 5/00* (2006.01)

(52) U.S. Cl.
CPC ........... *G01M 17/007* (2013.01); *G07C 5/006* (2013.01)

(58) Field of Classification Search
CPC ... G01M 17/007; G07C 5/006; G07C 5/0808; G07C 5/02; G06N 3/08; G06N 20/00
See application file for complete search history.

(56) References Cited

U.S. PATENT DOCUMENTS

| | | |
|---|---|---|
| 6,609,051 B2 | 8/2003 | Fiechter et al. |
| 11,017,305 B2 | 5/2021 | Sadasivam et al. |
| | (Continued) | |

FOREIGN PATENT DOCUMENTS

| | | |
|---|---|---|
| DE | 10 2004 023 323 A1 | 12/2005 |
| DE | 10 2017 200 855 A1 | 7/2018 |
| | (Continued) | |

OTHER PUBLICATIONS

European Patent Office, International Search Report issued in International patent application No. PCT/EP2021/084997 (Apr. 4, 2022).

(Continued)

*Primary Examiner* — Timothy P Graves
(74) *Attorney, Agent, or Firm* — Secant IP, PLLC

(57) ABSTRACT

A method for determining a condition of the components of an individual chassis includes preparing a first data set of vehicle data, which includes at least loading and/or wear data of the same or a similar chassis type over its entire lifetime, producing an individual second data set for a particular vehicle by determining the vehicle data as a target condition up to a predefined first kilometers-travelled count and/or a specified age of the individual vehicle, determining currently measured vehicle data from a predefined first kilometers-travelled count and/or a specified age of the particular vehicle, and comparing the currently measured vehicle data with the first data set and also the second data set, in order to determine the condition. Also disclosed is a vehicle system configured to execute the method and vehicle with the vehicle system.

14 Claims, 2 Drawing Sheets

(56)                    References Cited

U.S. PATENT DOCUMENTS

| 2003/0114965 A1* | 6/2003 | Fiechter | G05B 23/024 |
| | | | 714/E11.158 |
| 2016/0078690 A1 | 3/2016 | Lennevi et al. | |
| 2017/0268948 A1 | 9/2017 | List et al. | |
| 2018/0150776 A1* | 5/2018 | Anagnos | G06Q 30/0202 |
| 2018/0197355 A1* | 7/2018 | Remboski | G07C 5/0808 |
| 2019/0102959 A1 | 4/2019 | Saylor et al. | |
| 2021/0264693 A1 | 8/2021 | Rueck et al. | |

FOREIGN PATENT DOCUMENTS

| DE | 10 2018 119 652 A1 | 11/2018 |
| WO | 2020/031133 A1 | 2/2020 |

OTHER PUBLICATIONS

European Patent Office, Written Opinion issued in International patent application No. PCT/EP2021/084997 (Apr. 4, 2022).
German Patent Office, Office Action issued in German patent application No. 10 2021 203 266.4 (Jan. 1, 2022).

\* cited by examiner

1

METHOD AND VEHICLE SYSTEM FOR DETERMINING THE STATE OF THE COMPONENTS OF A CHASSIS

RELATED APPLICATIONS

This application claims the benefit under 35 U.S.C. § 371 as a U.S. National Phase Application of application no. PCT/EP2021/084997, filed on 9 Dec. 2021, which claims benefit of German Patent Application no. 10 2021 203 266.4 filed 31 Mar. 2021, the contents of which are hereby incorporated herein by reference in their entireties.

FIELD OF THE DISCLOSURE

The invention relates to a method and a vehicle system for determining the condition of the components of an individual chassis of a particular vehicle. Furthermore, the invention relates to a vehicle.

BACKGROUND

A vehicle usually has its own on-board diagnosis systems, which monitor vehicle components and systems, for example, for the purposes of routine inspections. For this, the systems compare vehicle data such as the number of kilometers travelled. Furthermore, vehicle diagnosis systems comprise sensors for monitoring, which report faults in the operation of the vehicle or in any components. However, such vehicle diagnosis systems only emit a report when a parameter is outside an acceptable range.

Until now there has been no possibility of predicting a possible fault condition or a possible failure, for example, due to wear.

However, wear of components can result in serious problems regarding the reliability of the components and of the more complex systems in which they are integrated. In fact, excessive wear of a basic component can damage the entire structural group in which it is integrated. Moreover, excessive wear of break linings, for example, can result in dangerous damage to the structural group of the brakes and therefore can compromise the safety of the vehicle.

DE 10 2018 119652 A1 discloses a vehicle which comprises a chassis with at least one chassis component and a driver assistance system for detecting a condition of the chassis component, wherein the driver assistance system comprises an evaluation unit and a first acoustic sensor, which detects a noise produced by the chassis component during driving operation of the vehicle and generates an electric signal, and with the help of the said electric signal the evaluation unit determines at least one information about the condition of the chassis component.

SUMMARY

It is therefore a purpose of the present invention to provide a method and a vehicle system by means of which the condition of the chassis can be determined more accurately, for example, in order to increase the driving safety. A further purpose is to provide a vehicle.

These objectives are achieved by a method having the characteristics specified in the present disclosure, by a vehicle system as also specified herein, and by a vehicle as specified herein.

Advantageous further developments, which can be used individually or in combination with one another, will be apparent in light of the present disclosure.

The objective is achieved by a method for determining the condition of the components of an individual chassis of a particular vehicle, which method comprises the following steps:

provision of a first data set of vehicle data, which includes at least loading and/or wear data of the same or a similar chassis type as the particular vehicle, over its entire service life, production of an individual second data set in a particular vehicle by determining the vehicle data as a target condition up to a first predefined kilometers-travelled count and/or up to a defined age of the individual vehicle, determination of current measured vehicle data from a predefined second kilometers-travelled count and/or a defined age of the individual vehicle, carrying out a comparison of the current measured vehicle data with the first data set and also the second data set, in order to determine the condition.

The chassis is preferably understood to be the two axles of the vehicle and also their components, but also only one axle as well as its components.

According to the invention, it was recognized that for the current assessment of the condition of a chassis at the time, above all, currently determined data from acceleration sensors are used. In this, changes of the vibration behavior are analyzed. However, previous investigations have not so far yielded any unique indicator for assessing the wear of the chassis with precision. The replacement of worn and new chassis components leads to a virtually infinite increase in the number of possible combinations.

However, if an assessment indicates a defect, driving safety may be endangered, especially if relevant structural components such as wheel suspensions, brakes, etc. are directly or indirectly concerned.

In this regard the invention has recognized that it is not enough to get wear data/information about the condition solely on the basis of the currently measured data. According to the invention, a first data set of vehicle data is prepared, which includes at least the loading and/or wear data relating to the same or a similar chassis type as the particular vehicle over its entire service life. This can be determined in the test field.

The first data set is obtained in a vehicle having a similar or the same chassis.

According to the invention, it was also recognized that an individual grasp of the individually equipped vehicle is necessary in order to establish a target condition. Thus, if the vehicle drives off as a new vehicle from the production line, the target condition is learned by determining the vehicle data. This learning process remains valid for a certain time and/or a number of kilometers travelled. During this process a second data set is produced, for example, from detected vibrations. In this context, according to the invention it was recognized that the target condition has to be determined not just in general terms, but rather with reference to the particular vehicle since a large variety of individual equipment produces different target data sets in each case. Thereafter, the current vehicle data are measured or detected from a predefined second kilometers-travelled count and/or a specified age of the individual vehicle. The second kilometers-travelled count can for example be shortly after the first kilometers-travelled count.

After that, according to the invention, with reference to the currently measured vehicle data, a comparison is carried out with the first data set and also with the second data set. That is, according to the invention, the current vehicle data are, so to say, compared with the target data or target condition, as also the current vehicle data with the first data set as the actually existing condition during a life cycle.

This comparison between the actual condition during the life cycle and the individually produced target condition generates a condition value by virtue of which information about the true condition of a chassis can be deduced. Thus, for example, at the end of the life cycle the conclusion 'completely worn out' can be reliably drawn with reference, above all, to the first data set with the assistance of the second data set. Furthermore, by virtue of the comparison with the two data sets information such as "80% completely worn out" or "corresponding to 20% of the as-new condition" can be obtained.

Thanks to the invention, a clear and reliable assessment of the condition of the chassis can be obtained since both the new condition of the particular vehicle as the initial basis, and also information about the entire life cycle of a similar or identical chassis, are used. An assessment of the departure from the new condition and also a comparison with the first data set as a representative life cycle are both carried out. From this, reliable information about the condition can be obtained.

In a further arrangement, the second data set is produced by associating the currently measured vehicle data with a road surface cluster that represents the road surface, or by applying a new road surface cluster in the case of a previously unknown road surface, and associating the currently measured vehicle data to the newly applied road surface cluster. To achieve a better correlation or comparison, a clustering of the road surface is carried out. If the road surface has not yet been recognized, then a new cluster is formed and stored with the recorded vehicle data as the second data set. In that way an improved second data set can be learned and accordingly, later, the condition of the chassis can be determined more accurately.

In a further preferred embodiment, the first data set is provided as a generically created reference data set by virtue of an identical or similar chassis type tested on a test stand in a cross-country test.

By a cross-country test carried out on a test stand, the first data set can be determined in a simple manner. With the test stand it is easily possible to identify particular frequency ranges, i.e., to produce footprints which can be referenced for a subsequent comparison.

Preferably, such a first data set can be produced by a purely analytical procedure and also by an artificial neuronal network or another machine-learning method. The generation of the first data set on a test stand also has the advantage that structural components can be replaced. For example, brake linings can be changed regularly, which subsequently produce other vibrations/frequencies with the already older, partially worn surrounding structural components. In that way, the first data set can be enlarged and also improved, whereby in a later comparison the current chassis condition of the individual vehicle can be better determined.

In a further development, the reference data set is generated separately for each of the two axles. In that way a selective comparison between the current vehicle data recorded at the front of the vehicle and the current vehicle data recorded at the rear of the vehicle can be carried out.

In another embodiment, as current measured vehicle data and also as the second data set, at least the vibration amplitudes of the vehicle's movements on characteristic road surfaces are used. In that way the frequency ranges determined on recognized road surfaces can be produced and assigned.

In a further variant, an existing condition is determined with reference to a comparison between the current measured vehicle data and the first data set, and a target condition is determined with reference to a comparison between the current measured vehicle data and the second data set, so that the current wear of the components of the chassis is in determined with reference to a target-versus-actual comparison. In this, the comparisons between the data sets and the current measured can also be differently weighted. Accordingly, the current wear condition of the chassis or its components can be determined. By virtue of the comparison, the data are compared with a data set that characterizes the life cycle with corresponding wear, and also a data set that represents the new condition. Thereby, a reliable assessment of the condition of the chassis can be obtained.

According to another further development, the current vehicle data are measured continuously or adaptively by the vehicle. In this, for example, one can proceed adaptively with reference to the age of the vehicle or with reference to the kilometers-travelled count, or when particular situations arise.

Furthermore, the currently measured vehicle data can include the number of kilometers travelled and/or the age of the vehicle. In that way the plausibility of the comparison or its result can be checked. The number of kilometers travelled can be used, for example, as representative of averaged load collectives and the age for the aging, for example, of rubber mountings.

In addition, the objective is achieved by a vehicle system for determining the condition of the components of an individual chassis of a particular vehicle, which system comprises:

a storage unit for producing a first data set of vehicle data, such that the first data set contains at least the loading and/or the wear data of the same or a similar chassis type of the particular vehicle over its entire service life, the storage unit for producing an individual second data set for a particular vehicle, such that the individual data set contains the measured vehicle data as a target condition up to a predefined first kilometers-travelled count and/or a specified age of the particular vehicle by means of the one or more sensors, a sensor system for detecting currently measured vehicle data, from a predefined second kilometers-travelled count and/or a specified age of the individual vehicle, a comparison unit for carrying out a comparison between the current measured vehicle data and the first data set and also the second data set, in order to determine the condition.

The advantages of the method can also be extended to the vehicle system.

The sensor system can consist of a plurality of different sensors and various sensor types.

The comparison unit can be in the form of a processor.

In a further version the sensor system is designed to detect the road surface. Moreover a processor is preferably provided in order to produce the second data set, by assigning the currently measured vehicle data to a road surface cluster that represents the road surface or by forming a new road surface cluster in the case of a previously unknown road surface and correlating the currently measured vehicle data with the newly formed road surface cluster and storing the second data set in the storage unit. For that purpose, the processor is connected for communication with the sensor system and with the storage unit. Furthermore, the processor, the comparison unit, and the storage unit can be combined in a single module.

In another version the comparison unit is designed to register an actually existing condition with reference to a comparison between the current measured vehicle data and the first data set, and to produce a target condition with reference to a comparison between the current measured vehicle data and the second data set, and in addition to determine the current wear condition of the components of the chassis with reference to a target-versus-actual comparison.

In a further version, the sensor system is designed to measure the current vehicle data continuously or adaptively.

In addition, the current measured vehicle data can include the number of kilometers travelled and/or the age of the vehicle.

Furthermore, the objective is achieved by a vehicle having a vehicle system as described above.

BRIEF DESCRIPTION OF THE DRAWINGS

Further properties and advantages of the present invention emerge from the following description, with reference to the attached figures which show, schematically.

DETAILED DESCRIPTION

Figure 1:
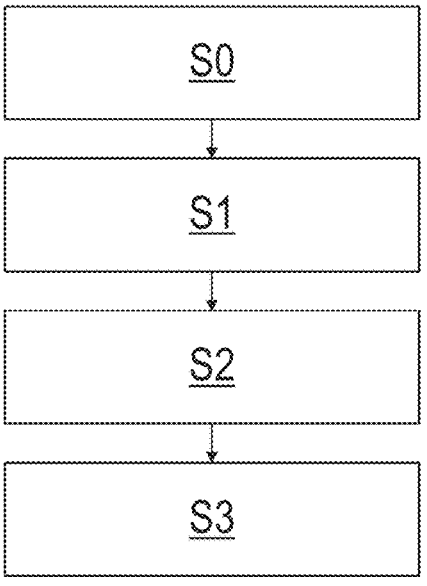
FIG. 1: An embodiment of a method according to the invention.

FIG. 1 shows an embodiment of a method according to the invention for determining a condition of the components of an individual chassis of an individual vehicle.

In this case, in a preliminary step S0 a first data set is produced to begin with. This is produced with reference to an identical or similar chassis which is fitted in the particular vehicle concerned. This first data set is generated by means of a cross-country test carried out on a test stand and reflects the life cycle of the chassis from its new condition up to the complete wearing-out of the chassis. By virtue of the cross-country test carried out on the test stand, certain vibrations and frequencies (frequency range) can be recognized, which pertain in each case to a particular condition of the chassis. Thus, in the case of brakes, when some wear already exists, a squealing noise is louder.

By virtue of the cross-country test, it is easily possible to identify certain frequency ranges, i.e., for example to produce footprints which can be taken into account for a later comparison. The first data set can be produced by a purely analytical procedure or even by an artificial neuronal network or some other machine-learning method.

However, by changing them, structural components affected by wear can be replaced on the test stand. This exchange is stored along with the subsequently produced first data set, above all the vibrations and frequencies. In that way, the first data set can be enlarged or completed. Thus, the first data set contains information about new structural components, worn components and worn but "still viable" components, and thus extensively reflects the frequency/vibration and load data over the entire life of the chassis. The first dataset produced in this way can contribute in a later comparison with the current chassis condition, deduced from the measured vehicle data of the individual vehicle, toward a more accurate determination of the condition of the actual chassis in the particular vehicle.

The production of the first data set on a test stand has the further advantage that structural components can be replaced selectively and knowingly. Thus, for example, brake linings can be replaced regularly, which thereafter produce other vibrations/frequencies with the already older, partially worn surrounding structural components. In that way, the first data set can be enlarged and also improved. This first data set is essentially a generic data set.

Thus, simplified generic data can be produced inexpensively. By generating such a first data set, reliability when setting up/creating the second data set can be ensured since, for example, the first data set can be referred to for plausibility.

Figure 2:
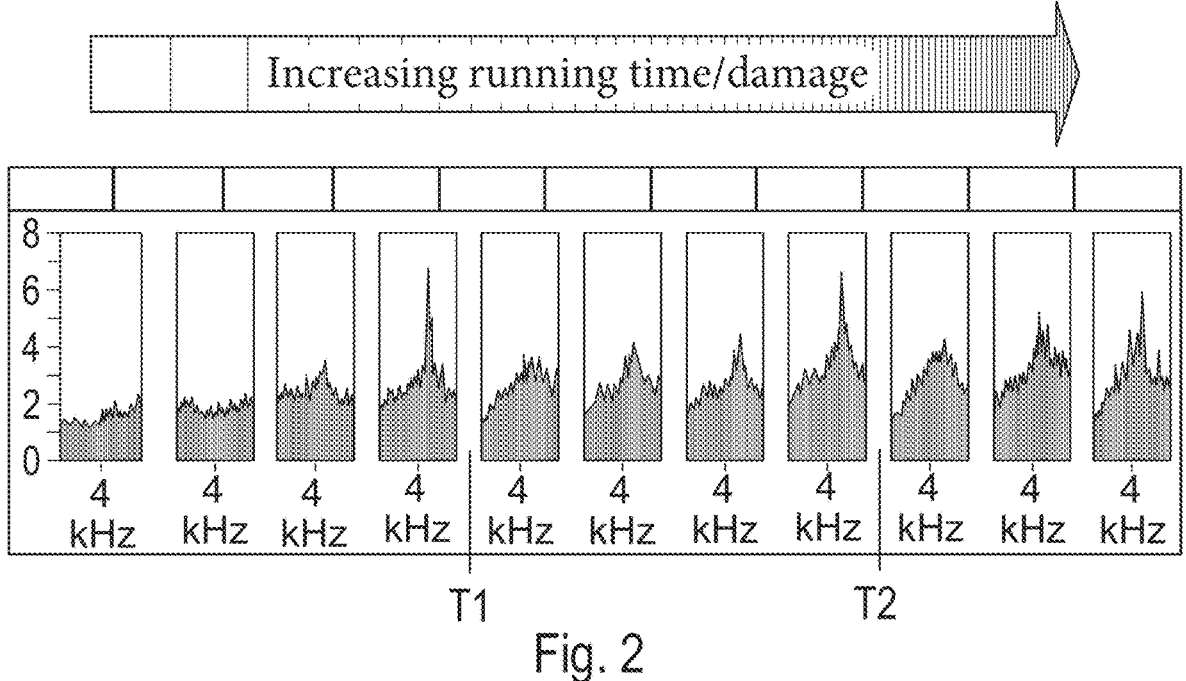
FIG. 2: An evaluation in the frequency range of a transverse control arm, over a section of its life.

FIG. 2 shows an evaluation in the frequency range of a transverse control arm over a lifetime segment. In this case the frequency spectrum extends from 3.5 to 4.5 Hz at the transverse control arm.

Here, at first an increase of the frequency by 86% and increasing damage is observed. After the replacement of the tension strut after about 100,000 km, at time-point T1, the frequency decreases by about 9%. With continued running time a further increase of the frequency by 28% occurs. This is reduced by around 24% by replacing the motor hydro bearing after travelling for around 200,000 km, at time T2. During the course of the life cycle, the damage increases severely, and the frequency determined increases further, by 15%.

By producing a generic data set on the test stand, for each axle, individual footprints, i.e., frequency profiles for the chassis concerned, can be created, which can be referred to for comparison purposes.

The creation of the first data set on the test stand in this case has the advantage that a replacement of various components is known exactly and also it can be determined better how the frequency range reacts thereto. In this, it can also be recognized, for example, how sensitively the frequencies/vibrations react to the failure of various components.

Moreover, by means of such a creation of a first data set, an entire life cycle of a chassis can be covered simply and inexpensively.

In a first step S1, an individual second data set is produced for a particular vehicle by detecting the vehicle data as a target condition up to a predefined first kilometer reading and/or a specified age of the individual vehicle. In that way, it is taken into account that every vehicle or many vehicles have individual equipment/properties, which generate individual vibrations/frequencies.

In that way, an individual learning process on the grounds of various equipment variants is ensured.

If the vehicle drives off the production line, a learning process of the target condition takes place in order to produce the second data set. This learning process remains valid for a certain time or for a certain number of kilometers travelled.

In order to produce a second data set as representative as possible, the road surface is detected by a sensor system, recognized and divided into clusters. The sensor system can consist of cameras, radar etc. sensors, and can also include information from the navigation system. Thus, for example, gravel roads, tarred surfaces, new and older road toppings can be classified. Preferably, these can be further subdivided according to the weather conditions.

If during the learning process new vibrations/frequencies are detected, then in the learning process they are assigned to the cluster concerned for subsequent comparison. If there is no cluster that represents the road surface, then a new cluster is created, for example by a processor.

In that way an improved second data set can be learned and accordingly, later, the condition of the chassis can be determined more accurately.

In a second step S2 current vehicle data, i.e., vibrations and frequencies, are detected by sensors. These sensors can be, for example, acceleration sensors. The current vehicle data are detected from a predefined second kilometers-travelled count and/or from a specified age of the individual vehicle. The age and the second kilometers-travelled count occur later than the first kilometers-travelled count.

The current vehicle data can be determined by the vehicle continuously or adaptively.

In a third step S3, a comparison is carried out between the currently measured vehicle data and the first data set and also the second data set. In that way, accordingly, the existing condition can be determined from the comparison of the current vehicle data with the first data set. The current vehicle data are compared with the first data set, whereby the state of wear can be determined. That is, from the comparison, the existing condition of the vehicle components is determined.

The comparison between the current vehicle data and the second data set corresponds to a comparison between the current condition and the target (new) condition. Accordingly, the difference from the new condition is determined and a target condition is determined with reference to a comparison between the currently measured vehicle data and the second data set.

The current wear of the components of the chassis is determined with reference to a target-versus-actual comparison.

Thus, a target-versus-actual comparison can be made in order to obtain information about the condition of the chassis. The comparison relates both to the new condition and also, for example, to the final condition (completely worn out) or to the lifetime condition. Thus, for example, a result may be "80% completely worn out", or "corresponding to 20% of the new condition".

Furthermore, the data sets can be differently weighted. With a newer vehicle, for example, the comparison with the second data set can contribute more to the final result than with an older vehicle.

In addition, parameters such as the number of kilometers travelled or the total age of the vehicle can be taken into account in order to check the plausibility. The kilometers travelled can be used to represent an averaged load collective, and the age for the aging, for example, of rubber mountings.

By virtue of the method according to the invention a clear and reliable assessment of the condition of a chassis can be obtained. Thus, driving safety can be increased or worn structural components can be replaced in good time.

Figure 3:
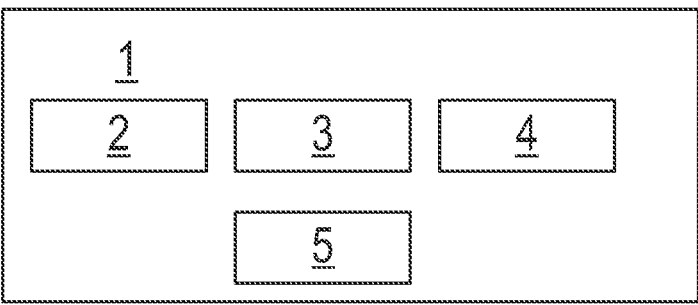
FIG. 3: A vehicle system according to the invention.

FIG. 3 represents schematically the vehicle system 1 for determining a condition of the components of an individual chassis of a particular vehicle.

The vehicle system 1 comprises a storage unit 2 for providing the data set of vehicle data, wherein the first data set reproduces the loading and/or wear data of the same or a similar chassis type of the particular vehicle over its entire life. This first data set is preferably generated inexpensively on a test stand in a cross-country test.

The storage unit 2 can be integrated in a control unit, for example. In the storage unit 2, by virtue of a sensor system 3 an individual second data set is stored. This is produced by the sensor system 3 of the vehicle itself. In this case the individual second data set is generated up to a predefined first kilometers-travelled count and/or a specified age of the vehicle and is established as a target condition. Depending on the particular road surface, the second data set is divided into a number of clusters which reflect the respective road surfaces.

With the same sensor system 3, current vehicle data can be detected or measured. This can be done continuously or adaptively. Vehicle data generally include vibrations and their frequencies. These can for example be detected by means of acceleration sensors.

In a comparison unit 4, with reference to a first and second data set a target-versus-actual comparison can be carried out. For this, the comparison unit 4 can be in the form of a processor. The processor can also be integrated in the control unit.

Furthermore, an output unit 5 can be provided. This can for example be a display or a cockpit indicator. If a target-versus-actual comparison value above a predetermined value is found, the comparison unit 4 can be designed to emit a warning signal via the output unit 5 or to propose an inspection deadline.

INDEXES

1 Vehicle system
2 Storage unit
3 Sensor system
4 Comparison unit
5 Output unit
T1, T2 Time points
S0 to S3 Steps

The invention claimed is:

1. A method for determining a condition of components of an individual chassis of a particular vehicle, the method comprising:

generating a first data set of vehicle data, which contains at least loading and/or wear data of a same or a similar chassis type as the particular vehicle over an entire lifetime of the particular vehicle;

producing an individual second data set for the particular vehicle by determining a target vehicle condition up to a predefined first kilometers-travelled count and/or up to a specified age of the particular vehicle;

determining currently measured vehicle data from a predefined second kilometers-travelled count and/or a specified age of the particular vehicle;

comparing the currently measured vehicle data with the first data set to produce a first comparison and further comparing the currently measured vehicle data with the second data set to produce a second comparison; and evaluating the first comparison and the second comparison in order to determine the condition.

2. The method according to claim 1, wherein producing the second data set comprises:

assigning the currently measured vehicle data to a road surface cluster that represents a road surface or forming a new road surface cluster associated with a previously unknown road surface; and assigning the currently measured vehicle data to the newly formed road surface cluster.

3. The method according to claim 1, wherein the first data set comprises a generically produced reference data set from the same or similar chassis type, tested on a test stand in a cross-country test.

4. The method according to claim 3, wherein the reference data set is produced separately for each of the two axles of the same or similar chassis type.

5. The method according to claim 1, wherein the currently measured vehicle data and the second data set-include vibration amplitudes of the vehicle's movements on characteristic road surfaces.

6. The method according to claim 1, wherein evaluating the first comparison and the second comparison comprises:

determining an existing condition with reference to the first comparison;

determining the target condition with reference to the second comparison; and determining the current state of wear of the components of the chassis with reference to a target-versus-actual comparison.

7. The method according to claim 1, wherein the current vehicle data are measured continuously or adaptively by the vehicle.

8. The method according to claim 1, wherein the current vehicle data includes the current kilometers-travelled count and/or the age of the vehicle.

9. A vehicle system for determining a condition of components of an individual chassis of a particular vehicle, the vehicle system comprising:

a storage unit for determining a first data set of vehicle data, wherein the first data set contains at least loading and/or wear data of a same or a similar chassis type as the particular vehicle over an entire life of the particular vehicle;

wherein the storage unit is configured for producing an individual second data set for a particular vehicle, such that the individual second data set contains measured vehicle data as a target condition up to a predefined kilometers-travelled count and/or up to a specified age of the particular vehicle, by means of the one or more sensors;

a sensor system configured for detecting currently measured vehicle data up to a predefined kilometers-travelled count and/or up to a specified age of the individual vehicle; and a comparison unit configured for carrying out a first comparison between the currently measured vehicle data and the first data set and a second comparison between the currently measured vehicle data and the second data set, in order to determine the condition.

10. The vehicle system according to claim 9, wherein the sensor system is configured to detect a road surface and the system further comprises a processor configured for producing the second data set by assigning the currently measured vehicle data to a road surface cluster that represents the road surface or by forming a new road surface cluster associated with a previously unknown road surface and assigning the currently measured vehicle data to the newly formed road surface cluster and storing the second data set in the storage unit.

11. The vehicle system according to claim 9, wherein the comparison unit is configured to determine an existing condition with reference to the first comparison and additionally configured to determine the target condition with reference to the second comparison, and further configured to determine the current wear condition of the components of the chassis with reference to a target-versus-actual comparison.

12. The vehicle system according to claim 9, wherein the sensor system is configured to measure the current vehicle data continuously or adaptively.

13. The vehicle system according to claim 9, wherein the currently measured vehicle data includes the current kilometers-travelled count and/or the age of the vehicle.

14. A vehicle comprising the vehicle system according to claim 9.

* * * * *